US011841005B2

(12) United States Patent
Neto et al.

(10) Patent No.: US 11,841,005 B2
(45) Date of Patent: Dec. 12, 2023

(54) DAMPING OF IN-PLANE VIBRATIONS IN MULTI-ROTOR STRUCTURES

(71) Applicant: VESTAS WIND SYSTEMS A/S, Aarhus N. (DK)

(72) Inventors: Julio Xavier Vianna Neto, Aarhus N (DK); Søren Dalsgaard, Hadsten (DK); Ian Couchman, Horley (GB); Jon Sowman, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/758,653

(22) PCT Filed: Jan. 12, 2021

(86) PCT No.: PCT/DK2021/050007
§ 371 (c)(1),
(2) Date: Jul. 12, 2022

(87) PCT Pub. No.: WO2021/143990
PCT Pub. Date: Jul. 22, 2021

(65) Prior Publication Data
US 2023/0035973 A1 Feb. 2, 2023

(30) Foreign Application Priority Data
Jan. 13, 2020 (DK) .................. 2020 70026

(51) Int. Cl.
*F03D 7/02* (2006.01)
*F03D 1/02* (2006.01)

(52) U.S. Cl.
CPC ............ *F03D 7/0296* (2013.01); *F03D 1/02* (2013.01); *F03D 7/0224* (2013.01); *F05B 2270/807* (2013.01)

(58) Field of Classification Search
CPC ........ F03D 7/0296; F03D 1/02; F03D 7/0224; F05B 2270/807
See application file for complete search history.

(56) References Cited

U.S. PATENT DOCUMENTS

2018/0017042 A1   1/2018   Baun et al.
2019/0055923 A1   2/2019   Caponetti et al.
(Continued)

FOREIGN PATENT DOCUMENTS

EP    3591218 A1    1/2020
WO    2016128004 A1   8/2016
(Continued)

OTHER PUBLICATIONS

PCT, International Search Report for Application PCT/DK2021/050007 dated Apr. 6, 2021.
(Continued)

*Primary Examiner* — Viet P Nguyen
(74) *Attorney, Agent, or Firm* — Patterson + Sheridan, LLP

(57) ABSTRACT

Embodiments herein describe in-plane vibration damping techniques for MR turbines. The MR turbines can include arms that extend from a common tower and support multiple rotors. Because the rotors are disposed laterally away from the tower, side-to-side motion of the tower causes the rotors to have an angled trajectory that includes both lateral and vertical displacement. In addition, a rotor disposed on one side of the tower in MR turbine can have a very different trajectory than a rotor disposed on the opposite side of the tower. To account for the vertical displacement and the different trajectories, in one embodiment, a controller can use different phase offsets for each rotor when calculating pitch offsets for performing in-plane vibration damping. In another embodiment, the controller can use both the lateral
(Continued)

and vertical accelerations of the rotors to identify the pitch offsets for the rotors to perform in-plane vibration damping.

18 Claims, 8 Drawing Sheets

(56) References Cited

U.S. PATENT DOCUMENTS

2019/0093630 A1  3/2019  Grunnet et al.
2019/0277256 A1  9/2019  Egedal

FOREIGN PATENT DOCUMENTS

| WO | WO-2017144063 A1 * | 8/2017 | ............... F03D 1/02 |
|----|---------------------|--------|---------------------------|
| WO | 2017202945 A1 | 11/2017 | |
| WO | 2019042515 A1 | 3/2019 | |
| WO | 2020007431 A1 | 1/2020 | |
| WO | 2021143990 A1 | 7/2021 | |

OTHER PUBLICATIONS

PCT, Written Opinion of The International Searching Authority for Application PCT/DK2021/050007 dated Apr. 6, 2021.
Danish Patent and Trademark Office, 1st Technical Examination including The Search Report for Application PA 2020 70026 dated Jul. 16, 2020.

* cited by examiner

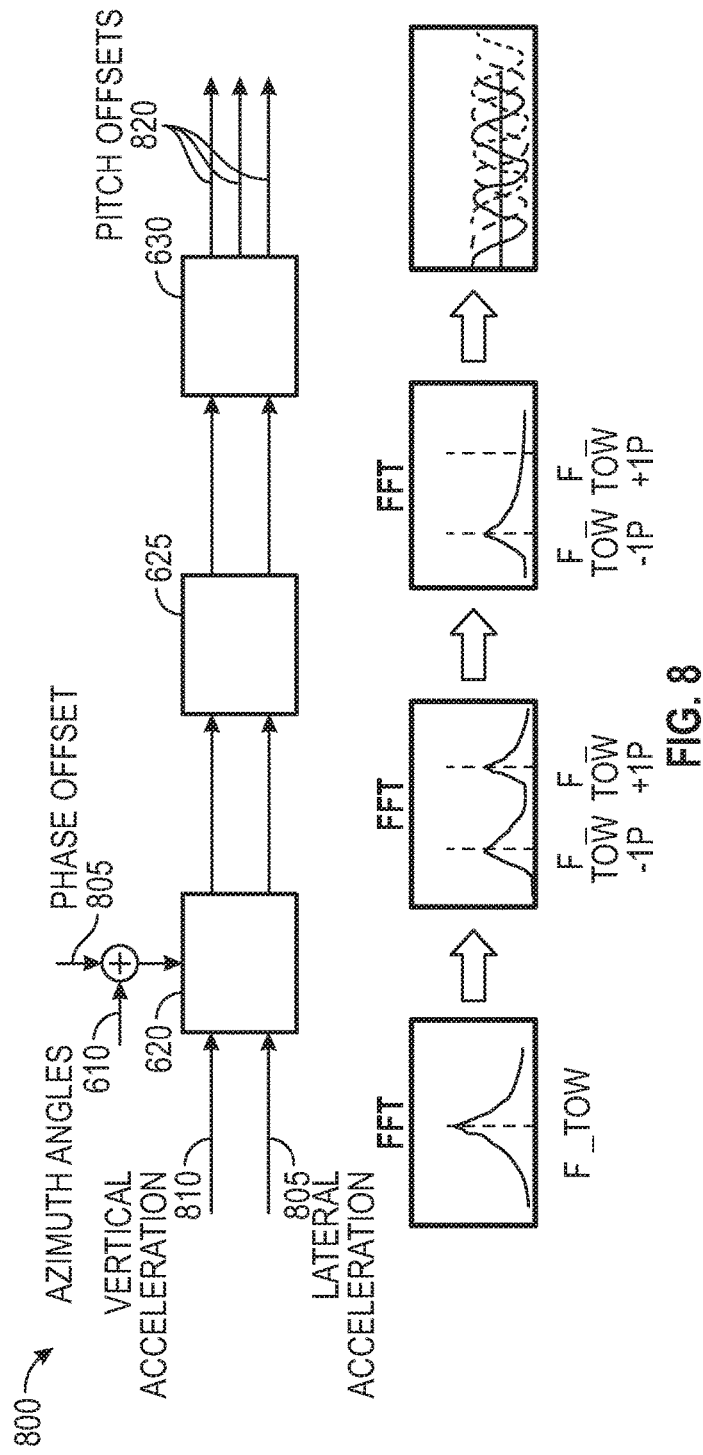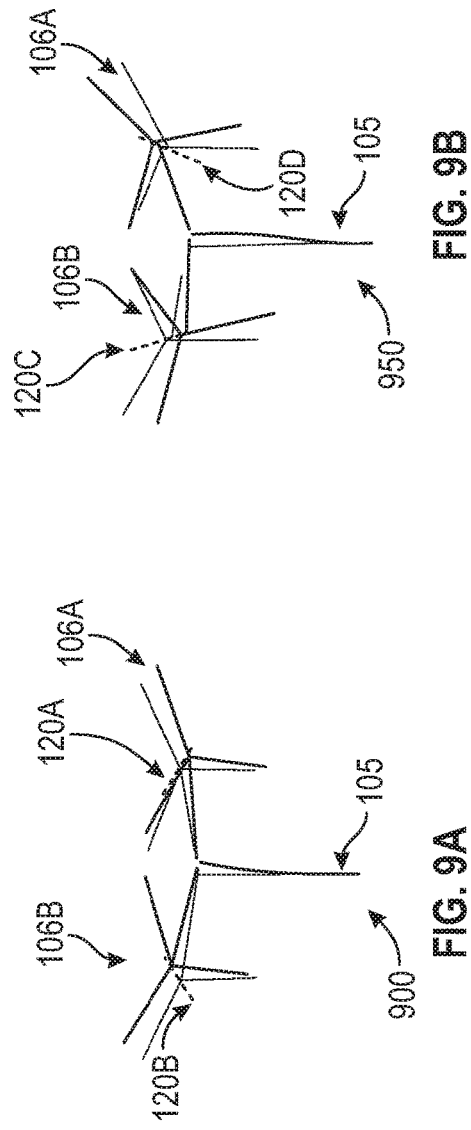

DAMPING OF IN-PLANE VIBRATIONS IN MULTI-ROTOR STRUCTURES

FIELD OF THE INVENTION

Embodiments presented in this disclosure generally relate to multi-rotor (MR) wind turbines and performing rotor in-plane vibration damping.

BACKGROUND

MR turbines typically include a tower on which multiple wind turbine rotors are mounted. Each rotor includes one or more blades that rotate to generate electricity. Each rotor can be mounted to a nacelle that includes various electrical and mechanical components such as a power converter (e.g., AC-DC and DC-AC), generator, breakers, and the like. Mounting several smaller rotors onto a single tower may provide advantageous over single (larger) rotor wind turbines such as reduced component, installation, and transportation costs.

MR turbines can be installed in similar locations as traditional single rotor turbines such as on-shore and off-shore. As a result, MR turbines may experience side-to-side motion which can fatigue the turbine and reduce its lifespan. While many different techniques are known for performing side-to-side tower dampening (SSTD) for single rotor turbines, other techniques may be beneficial for MR turbines where rotors can be installed on arms that extend away from the tower in a lateral direction. Thus, improved dampening techniques for MR turbines are needed.

SUMMARY

One embodiment of the present disclosure is a multi-rotor (MR) wind turbine that includes a tower structure, at least two rotors assemblies supported by the tower structure, each of the rotor assemblies comprising a plurality of blades, a sensor configured to generate a signal corresponding to in-plane motion in a rotor plane of a first rotor assembly of the at least two rotors assemblies, and a controller. The controller is configured to receive the signal corresponding to the in-plane motion and determine pitch offsets for controlling pitch angles of the plurality of blades of the first rotor assembly to produce an in-plane force in the form of a rotating or an oscillating force in the rotor plane of the first rotor assembly such that a phase of the in-plane force is dependent on a trajectory of the first rotor assembly caused by the in-plane motion where the trajectory of the first rotor assembly comprises both a lateral displacement and a vertical displacement.

Another embodiment described herein is a method and a computer-readable storage medium for operating a wind turbine comprising at least two rotors assemblies supported by a tower structure, each of the rotor assemblies comprising a plurality of blades. The method and the computer-readable storage medium includes receiving a signal corresponding to in-plane motion in a rotor plane of a first rotor assembly of the at least two rotors assemblies, determining pitch offsets for controlling pitch angles of the plurality of blades of the first rotor assembly to produce an in-plane force in the form of a rotating or an oscillating force in the rotor plane of the first rotor assembly such that a phase of the in-plane force is dependent on a trajectory of the first rotor assembly caused by the in-plane motion where the trajectory of the first rotor assembly comprises both a lateral displacement and a vertical displacement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore are not to be considered limiting of its scope, for the disclosure may admit to other equally effective embodiments.

FIGS. 6-8 illustrate control algorithms for generating pitch offsets for dampening side-to-side motion, according to one or more embodiments described herein.

FIGS. 9A and 9B illustrate first and second harmonics of a tower frequency, according to embodiments herein

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments herein describe in-plane vibration dampening techniques for MR turbines which consider both lateral and vertical displacements of the rotor assemblies due to the lateral displacement of the rotor assemblies. The MR turbines can include arms that extend from a common tower or multiple support elements attached to a common base that supports multiple rotors (which each includes a plurality of blades). Because the rotors are disposed laterally away from the tower or the base (rather than being disposed at the top of the tower as is typical with single rotor turbines), side-to-side motion of the tower (e.g., the tower swaying) causes the rotors to have an angled trajectory that includes both lateral and vertical displacement. A rotor in a single rotor turbine, in contrast, has a primarily horizontal or lateral trajectory as the tower sways from side-to-side (although though there may be a slight vertical displacement). In addition, a rotor disposed on one side of the tower in MR turbine has a very different trajectory than a rotor disposed on the opposite side of the tower when the tower experiences side-to-side motion.

To account for the vertical displacement and the different trajectories of the rotors in a MR turbine, in one embodiment, a controller can use different phase offsets for each rotor when calculating pitch offsets for performing in-plane vibration damping. Using simulations, a controller can perform a phase offset sweep to identify the phase offset value that yields optimized dampening for each rotor. These respective phase offsets, along with either side-to-side (i.e., lateral) or up/down (i.e., vertical) acceleration of the rotors, can then be used by the controller to identify pitch offsets for pitching the blades in the rotors to dampen the side-to-side motion (e.g., generate forces that counter the force(s) causing the side-to-side motion of the tower).

In another embodiment, the controller can use both the lateral and vertical accelerations of the rotors to identify the pitch offsets for the rotors to perform in-plane vibration damping. In one embodiment, the phase offsets used by the controller when calculating the pitch offsets may be the same value because using both lateral and vertical accelerations of the rotors account for both the vertical and lateral displacement of the rotors. Thus, regardless of the in-plane vibration damping strategy used, the controller can account for both the lateral and vertical displacement of the rotors.

Example Embodiments

Figure 1:
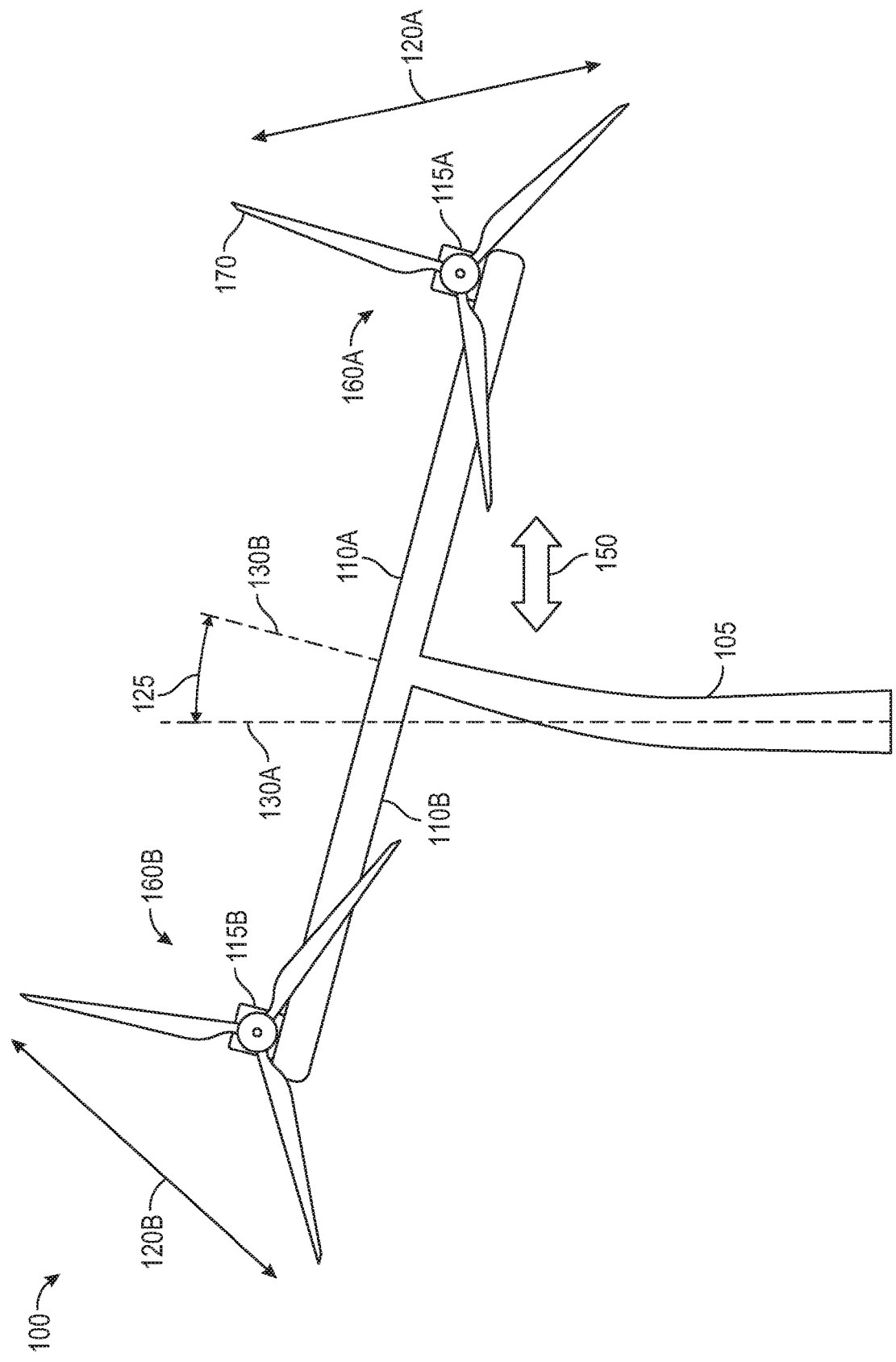
FIG. 1 illustrates a diagrammatic view of a MR wind turbine, according to one or more embodiments described herein.

FIG. 1 illustrates a diagrammatic view of a MR wind turbine 100, according to one or more embodiments described in this present disclosure. The wind turbine 100 (also referred to as a wind turbine generator) comprises a tower 105 (e.g., one example of a tower structure) from which two arms 110A and 110B extend. Respective nacelles 115 and rotors 160 (e.g., rotor assemblies) are disposed at distal ends of the arms 110. The rotors 160 may be connected with the nacelles 115 through a low speed shaft extending out of the nacelle 115 to drive a generator (not shown). The rotors 160 include three rotor blades 170 (or airfoils) mounted on a common hub which rotate in a rotor plane, but may comprise any suitable number of blades, such as one or more blades. The blades 170 typically have an aerodynamic shape with a leading edge for facing into the wind and a trailing edge at the opposite end of a chord for the blades 170 attached in a suitable manner.

For some embodiments, power conversion and power generation circuits may be located in the nacelle 115 or in a down-tower location such as a down-tower cabinet. The cabinet may also be located inside a base of the tower 105 for ready access and protection from weather events. These electronics may also be located off site or in a central location to a number of wind turbine generators, or spread out in any combination of these places.

The MR wind turbine 100 is shown as currently experience side-to-side motion 150 as illustrated by the double sided arrow. That is, side-to-side motion 150 causes the tower to sway in the left and the right directions and is parallel with the rotor planes established by the rotors 160. The motion 150 can be caused by any number of external forces such as the wind or waves (in the case of off-shore turbines) or generated by control parameters of the wind turbine. The axis 130A illustrates the center of the tower 105 in the absence of any side-to-side motion 150, while the axis 130B illustrates the orientation of the top of the tower 105 when experiencing the side-to-side motion 150. The movement of the center of the tower 105 from the axis 130A to the axis 130B causes the displacement 125. This displacement 125 results in respective displacements of the rotors 160. Because the rotors 160 are disposed laterally from the tower 105, the side-to-side motion 150 of the tower 105 (which is primarily a lateral or horizontal motion) results in angled motion of the rotors 160 which is illustrated by the trajectories 120. That is, the motion 150 causes the rotor 160B to have a trajectory 120B where the rotor 160B moves up and to the right as the tower 105 sways to the right and moves down and to the left when the tower 105 sways to the left. In contrast, the rotor 160A has a trajectory 120A where the rotor 160A moves down and to the right as the tower 105 sways to the right and moves up and to the left when the tower 105 sways to the left. Accordingly, the trajectories 120A and 120B are different since the rotors 160 are disposed on opposite sides of the tower 105.

While FIG. 1 illustrates the trajectories 120 as being primarily linear, the trajectories 120 will have some curve due to the rotational displacement 125 of the tower 105. In any case, a significant part of the trajectories 120 is defined by a vertical displacement of the rotors which results in the trajectories 120 being angled relative to the ground surface. This vertical displacement is generally absent from a single rotor turbine where the rotor is disposed on top of the tower. Further, the angles of the trajectories 120 can depend on the distance from the tower 105 to the rotors 160 and the height of the tower 105.

While FIG. 1 illustrates a first harmonic of the MR turbine 100, the turbine can vibrate (e.g., sway) at several different harmonics at the same time, e.g., a second harmonic, third harmonic, etc. which is described in more detail in FIG. 9.

Further, the MR turbine 100 illustrates only two rotors 160, but the MR turbine 100 can include any number of rotors. For example, the tower 105 could extend higher so that another set of rotors can be disposed on arms that are above the rotors 160 illustrated in FIG. 1. Further, the MR turbine 100 can have rotors disposed on the tower in addition to the rotors 160 disposed on the ends of the arms 110. For example, assuming there is sufficient clearance, a third rotor could be disposed at the top of the tower 105 (e.g., between the rotors 160A and 160B).

In one embodiment, rather than the MR wind turbine 100 having multiple rotor assemblies supported by a common tower, a different tower structure for a MR turbine can include a common base from which multiple support elements extend, each supporting a rotor assembly. In one embodiment, the support elements are disposed at non-perpendicular angles relative to a ground plane (e.g., the ground or surface of the water if the turbine is an offshore turbine). For example, the support elements may form a V-shape where the rotors are disposed on top of the support elements while the bottoms of the support elements are coupled to a common base. Like the MR wind turbine 100 illustrated in FIG. 1, side-to-side motion causes the rotors to have trajectories with substantial lateral and vertical displacements. Thus, the in-plane vibration damping dampening techniques described herein can apply to MR wind turbines with a variety of different tower structures.

Figure 2:
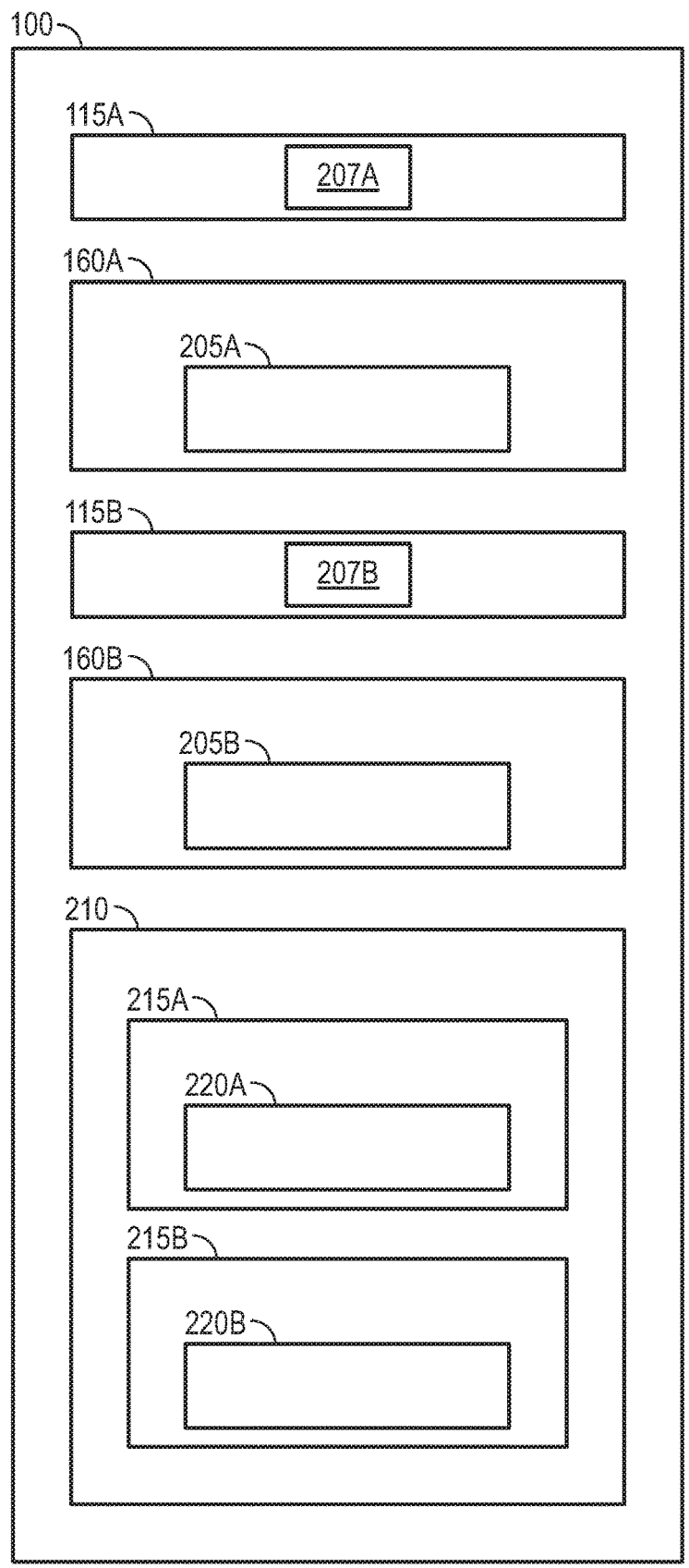
FIG. 2 illustrates a block diagram of a MR wind turbine, according to one or more embodiments described herein.

FIG. 2 illustrates a block diagram of the MR wind turbine 100, according to one or more embodiments described in this present disclosure. The MR wind turbine 100 includes the nacelles 115, the rotors 160, and a controller 210. In this example, the nacelles 115 include sensors 207 for measuring the motion of the nacelles 115 (and the corresponding rotors 160). In one embodiment, the sensors 207 generate a signal corresponding to in-plane motion in a rotor plane of a rotor 160. For example, the sensors 207 may be accelerometers that measure the lateral acceleration of the rotor 160 and the vertical acceleration of the rotor 160 in its corresponding rotor plane. In one embodiment, the vertical acceleration signal measured by the sensors 207 is high-pass filtered to remove the effect of gravity in the signal.

In this example, each nacelle 115 has its own respective sensors 207 for measuring motion (e.g., acceleration). However, in other embodiments, the motion of the nacelles 115 and the rotors 160 can be measured using a common sensor. For example, a single sensor could be used to measure the lateral acceleration of the nacelles rotors 160 since the rotors 160 should have similar acceleration in the lateral direction. However, it may be preferred to use separate sensors 207 disposed proximate to the rotors 160 (e.g., in the nacelle 115 or at the end of the arms 110 on which the rotor 160 is disposed) to improve the accuracy of the accelerations at the rotors 160 since the MR turbine 100 is not a perfectly rigid structure.

Each rotor 160 includes respective pitch actuators 205 that control the pitch of the blades in the rotor plane. The pitch actuators 205 can pitch the blades into and out of wind to increase and decrease the amount of power captured from the wind and also induce forces in the rotor plane that perform in-plane vibration damping.

The controller 210 can include one or more hardware components (e.g., processors, application specific integrated circuits (ASIC), memory, etc.) for controlling various functions of the MR wind turbine 100. In this embodiment, the controller 210 includes dampeners 215 for performing in-plane vibration damping techniques for countering a side-to-side motion of the tower. In one embodiment, the dampeners 215 are software modules or applications being executed by the controller 210 (e.g., a computing system). In another embodiment, the dampeners include hardware or firmware elements.

The dampener 215A generates pitch offsets 220A which are used to control the pitch actuators 205A of the rotor 160A while the dampener 2156 generates pitch offsets 220B used to control the picture actuators 205B of the rotor 160B. In one embodiment, the dampeners 215 use signals from the sensors 207 to generate the pitch offsets 220. Further, as described below, the dampener 215 can use a phase offset corresponding to the rotors 160 as well as the azimuth angles of the blades in the rotor planes to determine the pitch offsets 220.

In one embodiment, the pitch offsets 220 define an offset (in time or in phase) for a sinusoidal pitch value that controls the pitch angle of a blade. The dampeners select the pitch offsets 220 such that the blades apply a force in the rotor plane that counters or dampens the side-to-side motion. Referring back to FIG. 1, when the tower is swaying due to the side-to-side motion 150, the pitch offsets 220 cause a force in the rotor plane that counters this motion. As shown, the motion 150 causes the rotor 1606 to move along the trajectory 120B. When the rotor 160B moves along this trajectory 120B, ideally the pitch offsets 220 generates a force that is opposite in direction (and has its largest magnitude when the velocity of the rotor along the trajectory 120B is the greatest) to the velocity of the rotor 160B. When the rotor 1606 is at either extreme of the trajectory 1206 (when the tower 105 has swayed to either its rightmost or leftmost extreme due to the motion 150), the rotor 160B temporarily stops moving along the trajectory 120B in anticipation of switching directions along the trajectory 120B. At this point in time, ideally, the pitch offsets 220 do not generate a force along the direction of the trajectory 120B since any force would contribute, rather than dampen, the side-to-side motion (either by causing the turbine to sway further in one direction, or cause the tower to accelerate faster when beginning to move in the other direction). In one embodiment, when the rotor 160B is at or near the ends of the trajectory 120B, the pitch offsets 220 apply no force in the rotor plane, or at least apply a force that is perpendicular to the trajectory 120B so that there are no components of the rotor plane force that are parallel with the trajectory 120B.

Figure 3:
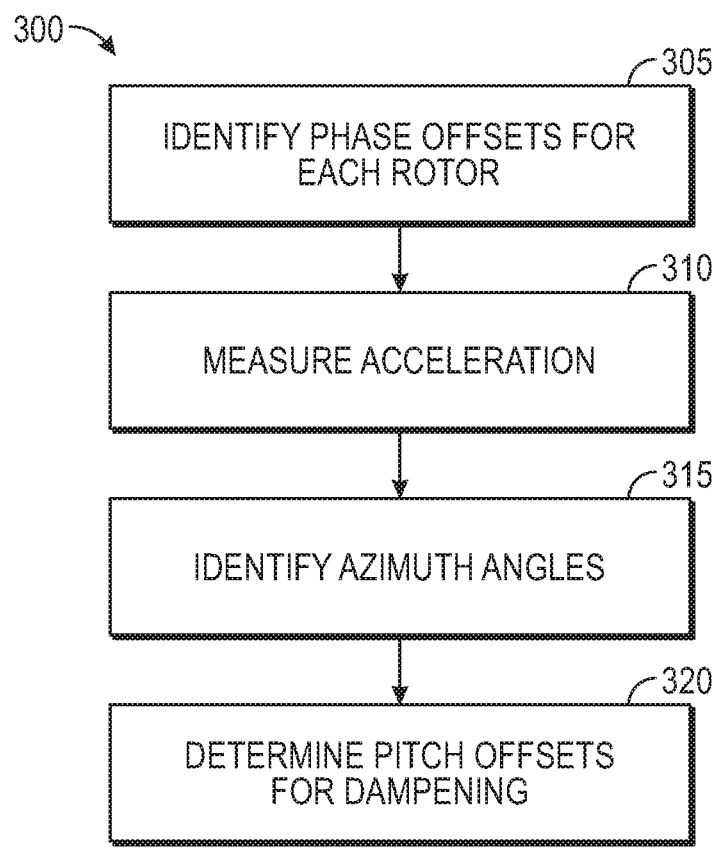
FIG. 3 illustrates a flowchart for performing side-to-side dampening on a MR wind turbine, according to one or more embodiments described herein.

FIG. 3 illustrates a flowchart of a method 300 for performing in-plane vibration damping on a MR wind turbine, according to one or more embodiments described in this present disclosure. At block 305, the controller identifies a phase offset for each rotor that is used to perform in-plane vibration damping. In one embodiment, in-plane vibration damping is performed to control (at least partially) the pitch offsets for the pitch angles of the blades for each rotor in the MR turbine. That is, the controller can include a dampener for each rotor that controls the pitch offsets of the pitches values of the blades in the rotor that performs in-plane vibration damping. However, in other embodiments, a subset of the rotors may be used to perform in-plane vibration damping. For example, the method 300 may be used to perform in-plane vibration damping for one rotor while another rotor is used to operate normally—i.e., where its pitch values (and any pitch offsets) are set without regards to the side-to-side motion of the tower. Further, one rotor may be used to perform in-plane vibration damping while another rotor is idle. In this manner, a subset of the rotors can perform in-plane vibration damping while the others do not. Further, the dampener can enable damping on one rotor for part of the cycle and enable dampening on another for the other part of the cycle. This could potentially be used to compensate for the side effects of the pitch offsets, such as tilt/yaw moments created by the pitch offsets.

In one embodiment, the phase offset is a constant value that is used to perform in-plane vibration damping. The phase offset represents a phase difference which is added between the steps of receiving the motion signal and delivering the pitch offsets used to control pitch values of the blades to dampen the side-to-side motion. For single rotor turbines, the phase offset is typically a value such that the force in the rotor plane generated by the pitch offsets has around 90 degrees phase in relation to the lateral acceleration. In other words, a force in the rotor plane that counters the side-to-side velocity. However, for MR turbines where the side-to-side motion of the tower causes substantial vertical displacement of the rotors, a 180 or 90 degree phase offset is often not optimal since it may not consider vertical displacement of the rotors.

In one embodiment, the phase offsets for the rotors that are used to perform in-plane vibration damping are different values; however, in another embodiment, the rotors can have the same phase offset value. In one embodiment, the phase offsets are determined before the MR turbine begins to operate (e.g., generate power). For example, the phase offsets can be identified by running one or more simulations that sweep the phase offset between a range of values to determine which phase offset results in the best dampening. When installing or configuring the wind turbine, this phase offset can be generated (or tuned) to adapt to the real-world structure and conditions of the wind turbine.

Figure 4:
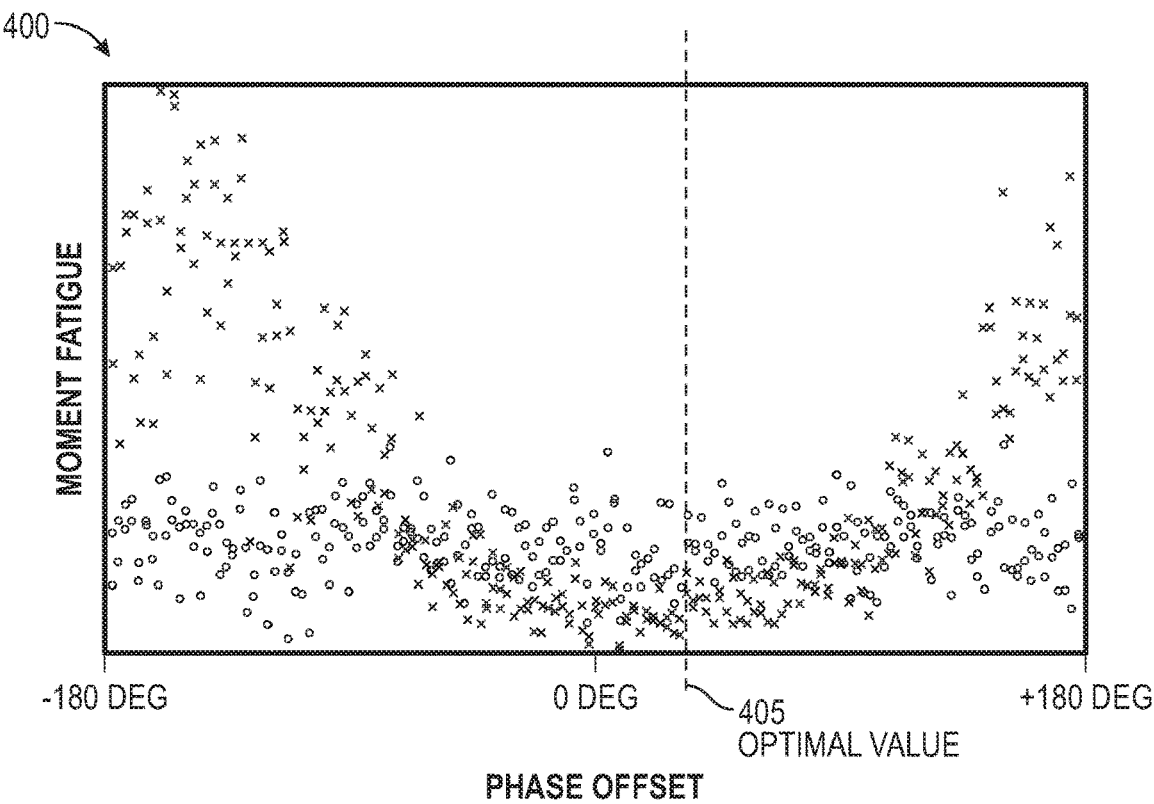
FIG. 4 illustrates results of a simulation for identifying a phase offset for a first rotor in a MR wind turbine, according to one or more embodiments described herein.

FIG. 4 illustrates results of a simulation for identifying a phase offset for a first rotor in a MR wind turbine, according to one or more embodiments described in this present disclosure. FIG. 4 illustrates a chart 400 where the phase offset for the first rotor was swept in a 360 degree range (x-axis) and the resulting moment fatigue of the MR turbine (y-axis) was measured. The circles indicate the moment fatigue of the wind turbine for the range when in-plane vibration damping was disabled (e.g., when the method 300 is not being performed using the first rotor) while the X's indicate the moment fatigue of the turbine when in-plane vibration damping is being performed using the first rotor.

As expected, the moment fatigue is essentially constant for the circle since the controller does not attempt to dampen the side-to-side motion. However, when in-plane vibration damping is active, the X's indicate that for some of the phase offset values, the first rotor adds to the moment fatigue while for other values it reduces the moment fatigue. This is because when in-plane vibration damping is in phase with the side-to-side motion (e.g., generates forces in the same directions as the forces causing the side-to-side motion), performing in-plane vibration damping can increase the side-to-side motion thereby increasing the moment fatigue on the wind turbine. However, when in-plane vibration damping is out of phase with the side-to-side motion, the rotor generates a force that counters or dampens the side-to-side motion which reduces the moment fatigue on the turbine. The optimal value 405 of the value of the phase offset which, when provided to the controller, results in the lowest loads. In this example, the optimal value 405 is around 25 degrees, but this will of course vary depending on the particular arrangement and structure of the MR turbine. As expected, for values of the phase offset that are approximately 180 degrees from the optimal value 405, performing in-plane vibration damping increases the load on the turbine since the forces generated by the first rotor constructively combine with the forces causing the side-to-side motion of the tower.

In one embodiment, the simulation generating FIG. 4 is performed assuming the other rotors in the MR turbine are not performing in-plane vibration damping. In one embodiment, the other rotors are idling during the simulation. Thus, the optimal value 405 captures information about the lateral and vertical displacement of the first rotor (and not any of the other rotors in the MR turbine). In this manner, the phase offset can be provided to the controller to provide more accurate pitch offsets when compared to an in-plane vibration damping technique that controls a single rotor turbine.

Figure 5:
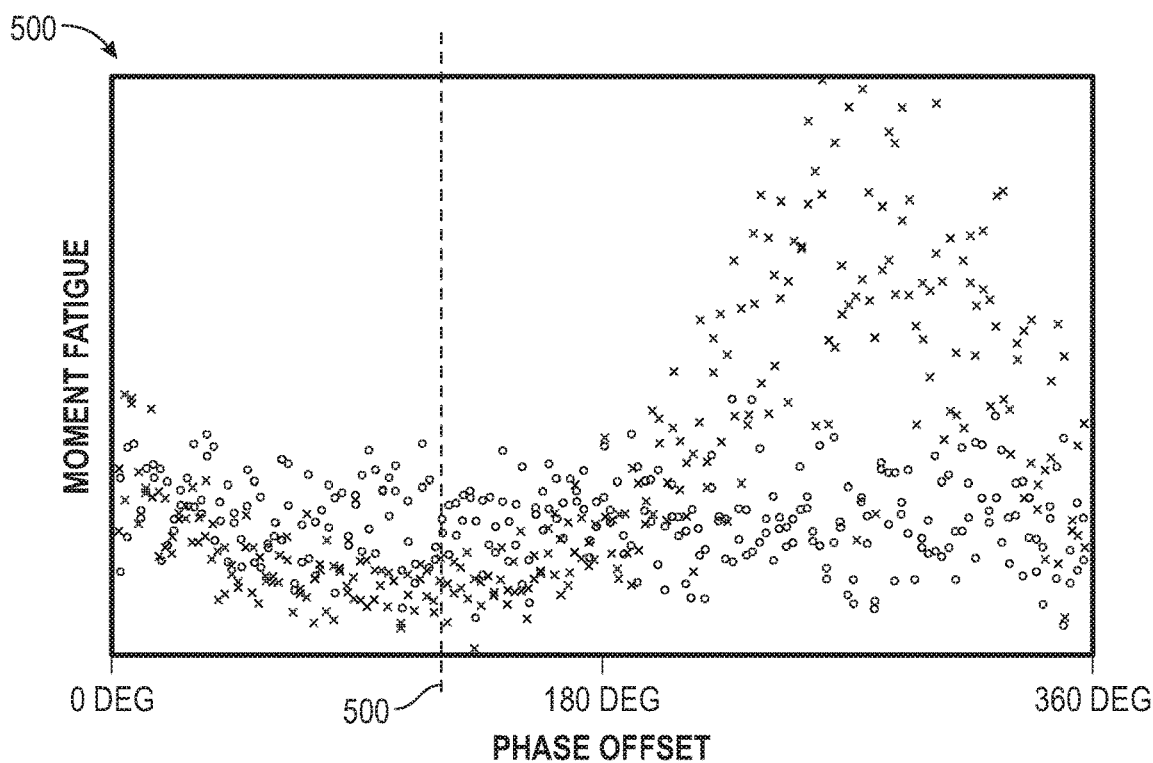
FIG. 5 illustrates results of a simulation for identifying a phase offset for a second rotor in a MR wind turbine, according to one or more embodiments described herein.

FIG. 5 illustrates results of a simulation for identifying a phase offset for a second rotor in a MR wind turbine, according to one or more embodiments described in this present disclosure. As an example, FIG. 4 could be the simulation used to identify the optimal phase offset for the rotor 160A for the MR turbine 100 in FIG. 1 while FIG. 5 is the simulation used to identify the optimal phase offset for the rotor 160B.

Like in FIG. 4, the circles in the chart 500 in FIG. 5 are measured when in-plane vibration damping is disabled on the second rotor while the X's are measured when in-plane vibration damping is enabled on the second rotor. When disabled, the circles illustrate that the moment fatigue is generally constant while the X's indicate that different phase offset values can increase the moment fatigue (e.g., phase offset values around 190-340 degrees) while other values decrease the moment fatigue (e.g., phase offset values between 60-120 degrees). In this example, the phase offset of the second rotor has an optimal value 505 of around 120 degrees which, when used to perform in-plane vibration damping, results in dampening the side-to-side motion the most.

In one embodiment, the simulation producing the data illustrated in chart 500 is performed assuming the other rotors in the MR turbine are not performing in-plane vibration damping. For example, the first rotor (and any other rotors in the MR turbine) may be idling during the simulation.

While FIGS. 4 and 5 illustrate using wind turbine simulations to identify the optimal values for each rotor in the MR turbine, in one embodiment, the phase offsets may be further adjusted once the MR turbine is installed. The phase offsets can also be identified after the MR turbine is installed. For example, while the controller may not perform sweeps of the phase offset, during the installation or configuration, the controller can identify the trajectory of the rotors. Then using for example a look-up table from trajectory to phase offset, the phase offset can be determined. In this case the look-up table has been a priori defined by sweeping the phase offset in simulations with various configurations of trajectories.

As discussed in more detail below, some in-plane vibration damping techniques or algorithms use different phase offsets for each rotor when identifying the pitch offsets for those rotors. That is, if the controller performs in-plane vibration damping on both the first and second rotors associated with FIGS. 4 and 5, the controller uses the optimal value 405 for the dampener that generates pitch offsets for the first rotor but uses the optimal value 505 for the dampener that generates pitch offsets for the second rotor. In other in-plane vibration damping techniques, the controller may use the same phase offset for both the first and second rotors.

Returning to the method 300, at block 310 a sensor on the MR turbine measures an acceleration of the rotor caused by the side-to-side motion of the tower. In one embodiment, the sensor generates a signal corresponding to in-plane motion in a rotor plane of a first rotor (e.g., a first rotor assembly) of the MR wind turbine such as a signal derived from a lateral acceleration of the rotor, a vertical acceleration of the rotor, or both. As discussed above, the sensor (e.g., accelerometer or other motion sensor) may be disposed proximate to the rotor to accurately measure its accelerations—e.g., at a nacelle or on the same end of the arm as the rotor. Moreover, there may be two sensors at each rotor—one for measuring lateral accelerations and one for measuring vertical accelerations. Alternatively, with the aid of an accurate model, sensor(s) located in the tower could be sufficient for estimating the trajectories of the rotor assemblies.

At block 315, the controller identifies azimuth angles of the blades in the rotor plane. The azimuth angles define the position of the blades in the rotor plane.

At block 320, the dampener for the rotor determines pitch offsets for the individual blades in the rotor to dampen the side-to-side motion of the tower, which in turn dampens the angled motion of the rotor (as illustrated by the trajectories 120 in FIG. 1). That is, the dampener determines pitch offsets for controlling pitch angles of the plurality of blades of the first rotor assembly to produce an in-plane force in the form of a rotating or an oscillating force in the rotor plane of the first rotor such that a phase of the in-plane force is dependent on a trajectory of the first rotor assembly caused by the in-plane motion. The wind turbine then uses the pitch offsets to generate pitch values for performing dampening on one or more or the rotors.

Figure 6:
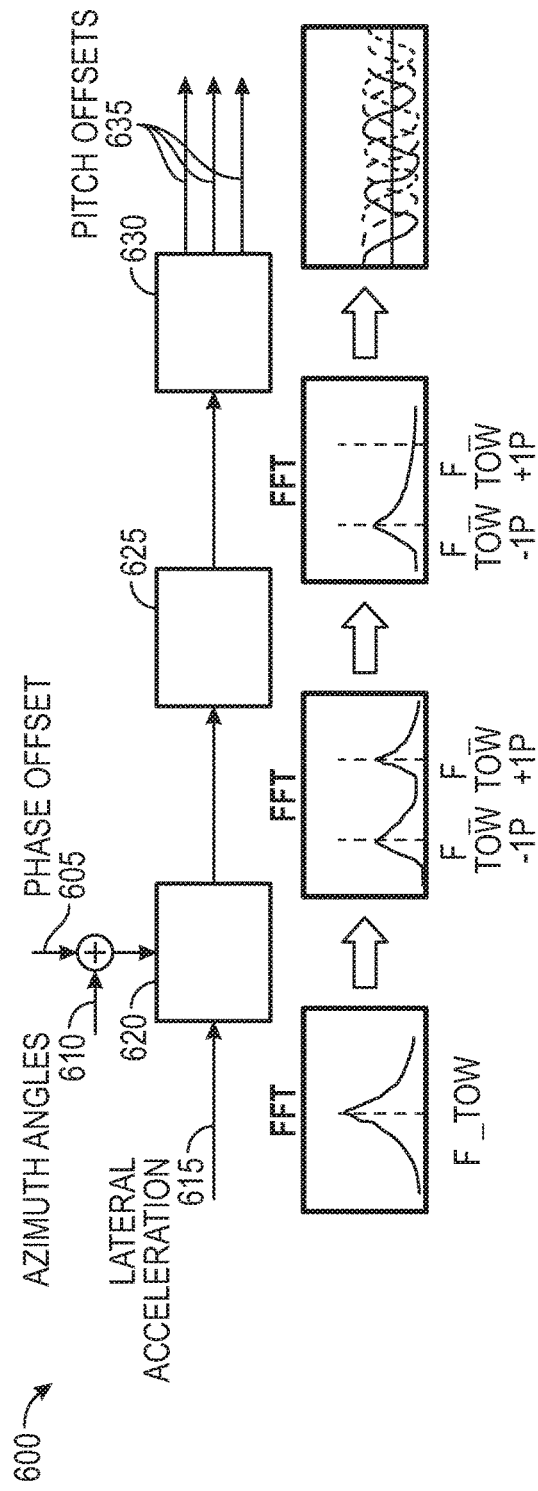
Figure 7:
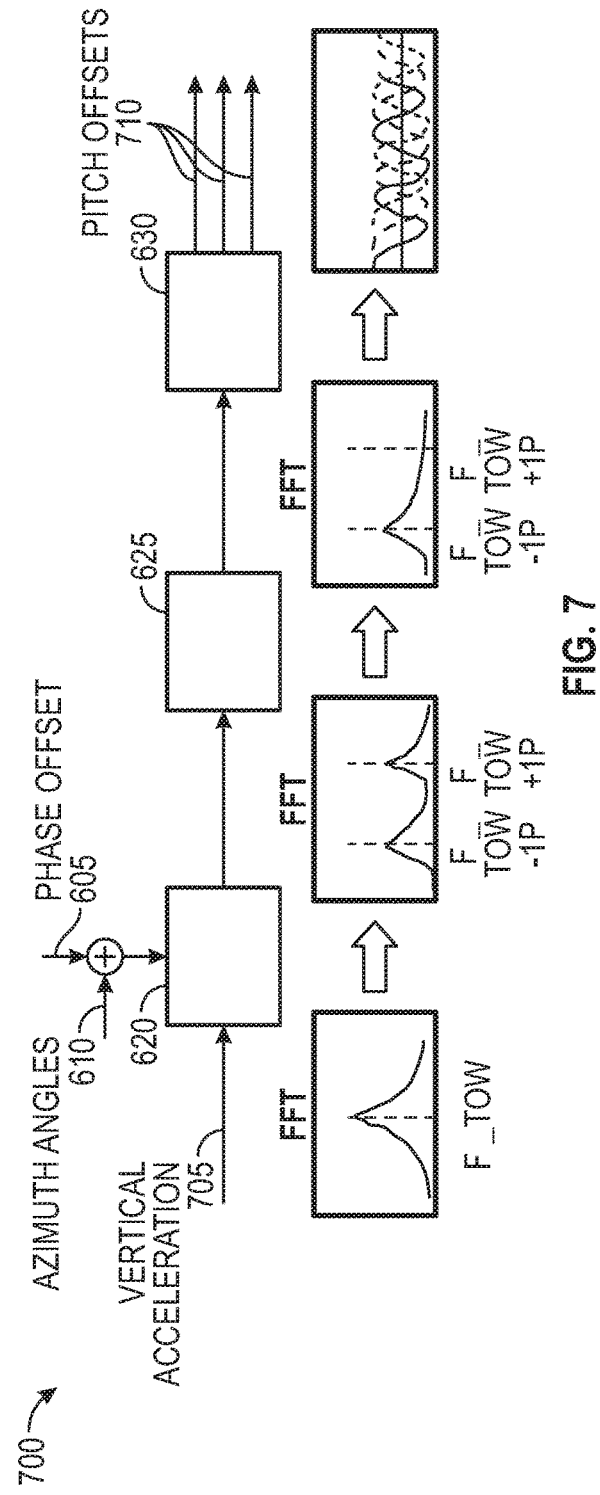

FIGS. 6-8 illustrate control algorithms for generating pitch offsets for dampening side-to-side motion, according to one or more embodiments described in this present disclosure. That is, FIGS. 6-8 illustrate different in-plane vibration damping techniques that can be used at block 320 by the dampener to generate the pitch offsets for pitch values of the blades in a rotor assembly.

FIG. 6 illustrates an in-plane vibration damping control system 600 where a phase offset 605 of the rotor being used to perform in-plane vibration damping is combined with the azimuth angles 610 of the blades in the rotor. The phase offset 605 may have the optimal value identified when executing a simulation as illustrated in FIGS. 5 and 6. Alternatively, the value of the phase offset 605 may be identified during a testing phase of the turbine after it has been installed.

The combination of the phase offset 605 and the azimuth angles 610 is then provided as an input to a rotation function 620 that calculates the transformation of the lateral acceleration 615 (as measured by a sensor proximate to the rotor) on the rotor plane. The leftmost graph below the rotation function 620 is a fast Fourier transform (FFT) that illustrates the tower frequency (F_tow)—i.e., the frequency at which the tower sways from side to side. The next graph illustrates that after the rotation function 620 rotates the force, the single tower frequency becomes two peaks with a displacement of 1P (once per revolution) which is, approximately, the frequency of the rotor. Thus, the rotation function generates a signal with a first peak that is at the tower frequency minus the rotor frequency and a second peak that is at the tower frequency plus the rotor frequency.

A harmonic filter 625 removes one of the peaks from the signal (the second peak in this example). This is often done to limit or filter the amount of pitch activity from performing in-plane vibration damping. This filtered signal is then provided to a projection function 630 which projects the force onto the axes of the blades in the rotor. That is, the projection function 630 determines pitch offsets 635, which in turn produce the in-plane force. That is, the projection function 630 outputs individual pitch offsets 635 for the blades in the rotor plane that generate the dampening force in the rotor plane. The graph below the projection function 630 illustrates pitch offsets 635 for three pitch values (e.g., the three sinusoidal signals) that can be used to control the blades such that they generate a force in the rotor plane that dampens the side to side motion of the tower. That is, each pitch value has a different phase offset 635 so that a pitch value of one blade reaches a maximum and minimum at a different point of time than the pitch value of a second blade (e.g., 120 degree offset from each) in order to counter the side-to-side motion of the tower structure. The pitch offsets 635 (and the resulting pitch angles of the blades) produce an in-plane force in the form of a rotating or an oscillating force in the plane of the rotor. This in-plane force is dependent on the trajectory of the rotor caused by the in-plane motion— e.g., the side-to-side motion of the tower structure which causes a trajectory of the rotor that includes substantial vertical and lateral displacements. The in-plane force dampens the side to side motion of the tower structure.

In one embodiment, the in-plane vibration damping control technique 600 is executed on multiple rotors of a MR turbine. For example, multiple instances of the in-plane vibration damping control technique 600 can be executed by the controller (e.g., by separate dampeners) in parallel. In that case, the phase offset values 635 may be different (e.g., the different optimal values illustrated in FIGS. 4 and 5 for two rotors in the same MR turbine). Further, the azimuth angles 610 may be different for the different turbines. Also, while the same lateral acceleration 615 can be used, it may be more accurate to use lateral accelerations measured by accelerometers proximate to the respective rotors. In this manner, the in-plane vibration damping control system 600 can be used to generate individual pitch offsets for one, some, or all of the rotors in a MR turbine to perform in-plane vibration damping.

FIG. 7 illustrates an in-plane vibration damping control system 700 similar to the system 600 in FIG. 6 except that a vertical acceleration 705 is used as an input to the rotation function 620 rather than the lateral acceleration. However, the remaining parts of the control system 700 are the same and output pitch offsets 710 for the blades in the rotor. Although the lateral acceleration is not used in the system 700, the phase offset 605 helps to account for the lateral acceleration.

FIG. 8 illustrates an in-plane vibration damping control system 800 similar to the systems 600 and 700 except that both the lateral acceleration 810 and the vertical acceleration 815 of a rotor are inputted into the rotation function 620. Because the control system 800 receives both accelerations, the phase offsets 805 for the rotors performing in-plane vibration damping may be the same. That is, in the in-plane vibration damping control system 600 and 700 in FIGS. 6 and 7, the phase offsets accounted for accelerations that were not being measured or used as an input into the rotation function 620. However, in the control system 800, both accelerations 810, 815 are provided to the rotation function 620. As a result, the phase offset 805 does not need to compensate for the lack of a measured acceleration in one direction. For example, a simulation can be run for one of the rotors to sweep the phase offset values and identify the optimal value. This optimal value can then be used as the phase offset 805 for all the rotors used to perform in-plane vibration damping. Put differently, the phase offset 805 is independent of the trajectory of the rotor caused by the side-to-side motion of the tower while the phase offsets 605 and 705 are dependent on the trajectory of the individual rotors when the tower sways side to side. In either case, however, the phase of the in-plane force generated by the pitch offsets in relation to e.g. the lateral acceleration is still dependent on the trajectory of the rotor.

Besides these differences, the in-plane vibration damping control system 800 uses the same functions as in FIGS. 6 and 7 to generate pitch offsets 820 for controlling the pitch of the blades of the rotor to reduce the side-to-side motion of the tower.

FIGS. 9A and 9B illustrates first and second harmonics of a tower frequency, according to embodiments herein. That is, FIGS. 9A and 9B illustrate the tower 105 experiencing tower vibration with two harmonics. External forces (e.g., winds or waves) as well as control parameters of the turbine can induce a side-to-side motion of the tower 105 that has multiple harmonics. For example, the side-to-side motion can include a plurality of harmonics that have different magnitudes. In some environmental conditions, the side-to-side motion may be dominated by the motion caused by a first harmonic 900 of the tower while the magnitude of a second harmonic 950 of the tower may be smaller. However, in other environmental conditions, the reverse may be true where the second harmonic 950 may have a much larger magnitude than the first harmonic 900. Also, while FIGS. 9A and 9B illustrate two harmonics of a tower, the tower may be affected by vibrations with more than two harmonics.

The result of the first harmonic 900 as illustrated in FIG. 9A causes the tower to sway in manner that results in the rotors 160A and 160B moving along the trajectories 160A and 160B, respectively. However, when the tower 105 vibrates at the second harmonic 950 as illustrated in FIG. 9B, the rotors move along the trajectories 160C and 160D. That is, the first harmonic 900 causes the rotor 160B to move along the trajectory 120B but the second harmonic 950 causes the rotor 160B to move along the trajectory 120C. Thus, each harmonic in the tower frequency can result in a different trajectory of the rotors 160. Because in some situations the side-to-side motion of the tower 105 may be dominated by different harmonics, it may be advantageous to use an in-plane vibration damping technique that can dampen a tower vibration that includes multiple harmonics.

Figure 10:
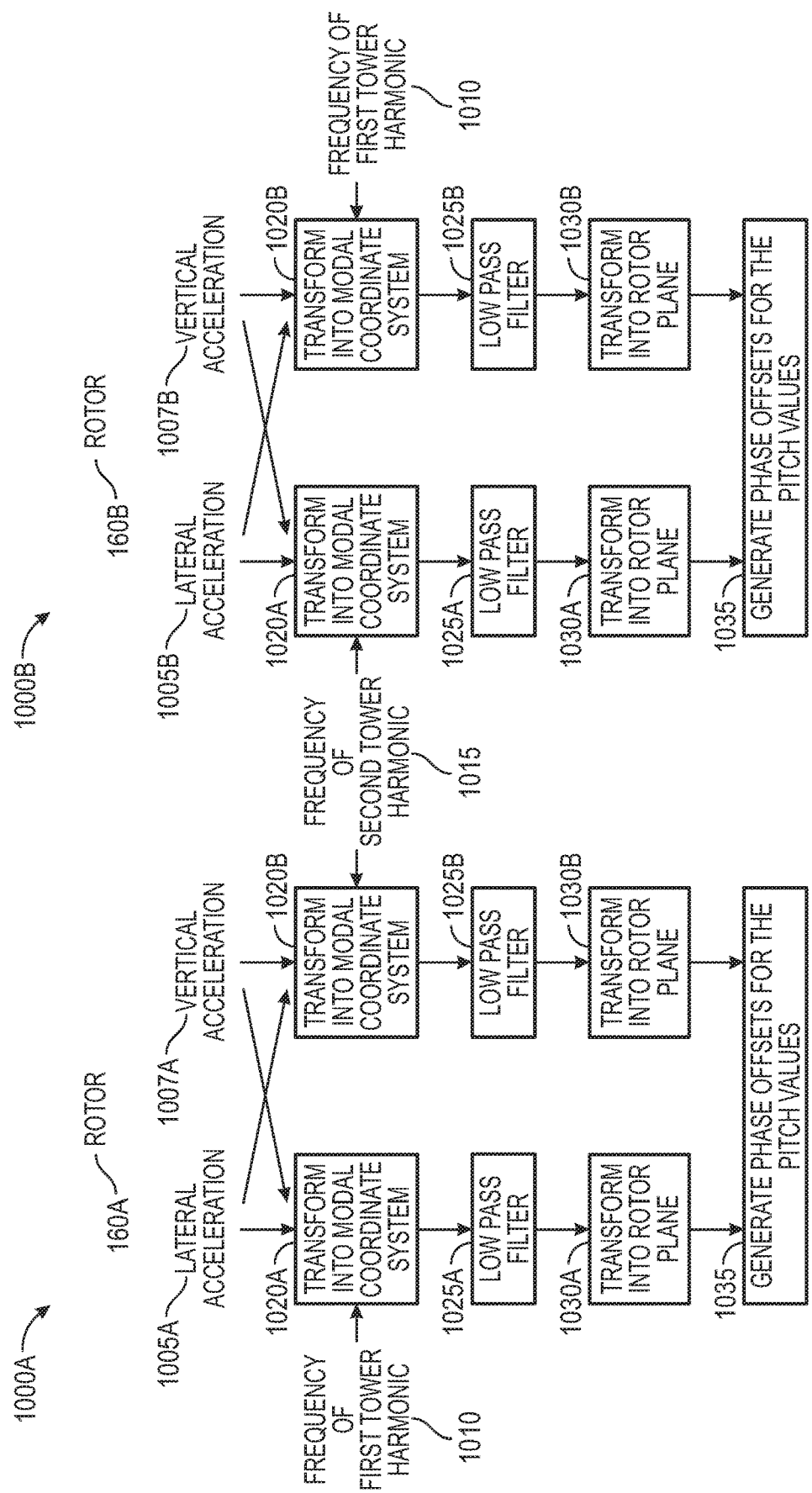
FIG. 10 illustrates generating phase offsets to compensate for tower vibrations with multiple harmonics, according to one or more embodiments herein.

FIG. 10 illustrates generating phase offsets to compensate for tower vibrations with multiple harmonics, according to one or more embodiments described in this present disclosure. FIG. 10 illustrates two flow charts that can be executed to perform in-plane vibration damping on two rotors (i.e., rotors 160A and 160B) in a MR turbine to compensate for a tower vibration having multiple harmonics. The chart 1000A illustrates the blocks for performing in-plane vibration damping on the rotor 160A while the chart 1000B illustrates the blocks for performing in-plane vibration damping on the rotor 160B.

The chart 1000A begins by receiving or measuring the lateral acceleration 1005A and the vertical acceleration 1007A of the rotor 160A. These accelerations 1005A, 1007A can be measured using sensors disposed proximate to the rotor 160A. Both of the accelerations 1005A and 1007A are used as inputs into blocks 1020A and 1020B which transform the signals into a modal coordinate system. In one embodiment, the modal coordinate system is a coordinate system that rotates at the harmonic frequency of the tower. Thus, at blocks 1020A and 1020B, the dampener transforms the accelerations 1005A and 1007A from a fixed coordinate system in which these signals were measured into the modal coordinate system which rotates according to the harmonic frequency.

In addition to receiving the accelerations 1005A and 1007A, the blocks 1020A and 1020B also receive the frequency of the first and second harmonics of the tower. That is, the frequency of the first tower harmonic 1010 is provided to block 1020A while the frequency of the second tower harmonic 1015 is provide to block 1020B. The frequencies of the harmonics 1010 and 1015 are modal frequencies (e.g., the first harmonic is a first mode of the tower and the second harmonic is a second mode of the tower) which then are used to determine the modal coordinate system. Since these first and second harmonics are different frequencies, so are the modal coordinate systems used at blocks 1020A and 1020B.

At blocks 1025A and 1025B, the transformed signals are passed through a low pass filter to remove high order frequencies. Transforming the accelerations 1005A and 1007A into the modal coordinate system at blocks 1020A and 1020B and then performing a low pass filter is advantageous since it results in a clean signal at only a desired frequency (e.g., a low frequency). Further, transforming the signals into the modal coordinate system means the higher frequency components can be removed at the point of generation (i.e., in the modal coordinate system) as opposed to notch filtering afterwards.

At blocks 1030A and 1030B, the filtered signals are transformed into the rotor plane and projected onto the axis of the blade. In one embodiment, after transforming the signals into the coordinates of the rotor plane, the dampener combines the signals. Because the signals are at different frequencies, they can be combined by adding them together. The combined signals are then projected onto the axis of the blades to generate the individual pitch offsets that can be used to control pitch values of the blades. These pitch offsets can dampen a tower vibration that is a combination of a first harmonic and a second harmonic.

The chart 1000B has the same blocks as the chart 1000A. However, instead of using the accelerations of the rotor 160A, the lateral acceleration 1005B and the vertical acceleration 1007B of the rotor 160B is instead fed into the blocks 1020A and 1020B. The result at block 1035 are phase offsets for the pitch values used to control the blades of the rotor 160B to dampen a tower vibration that includes first and second harmonics.

Figure 11:
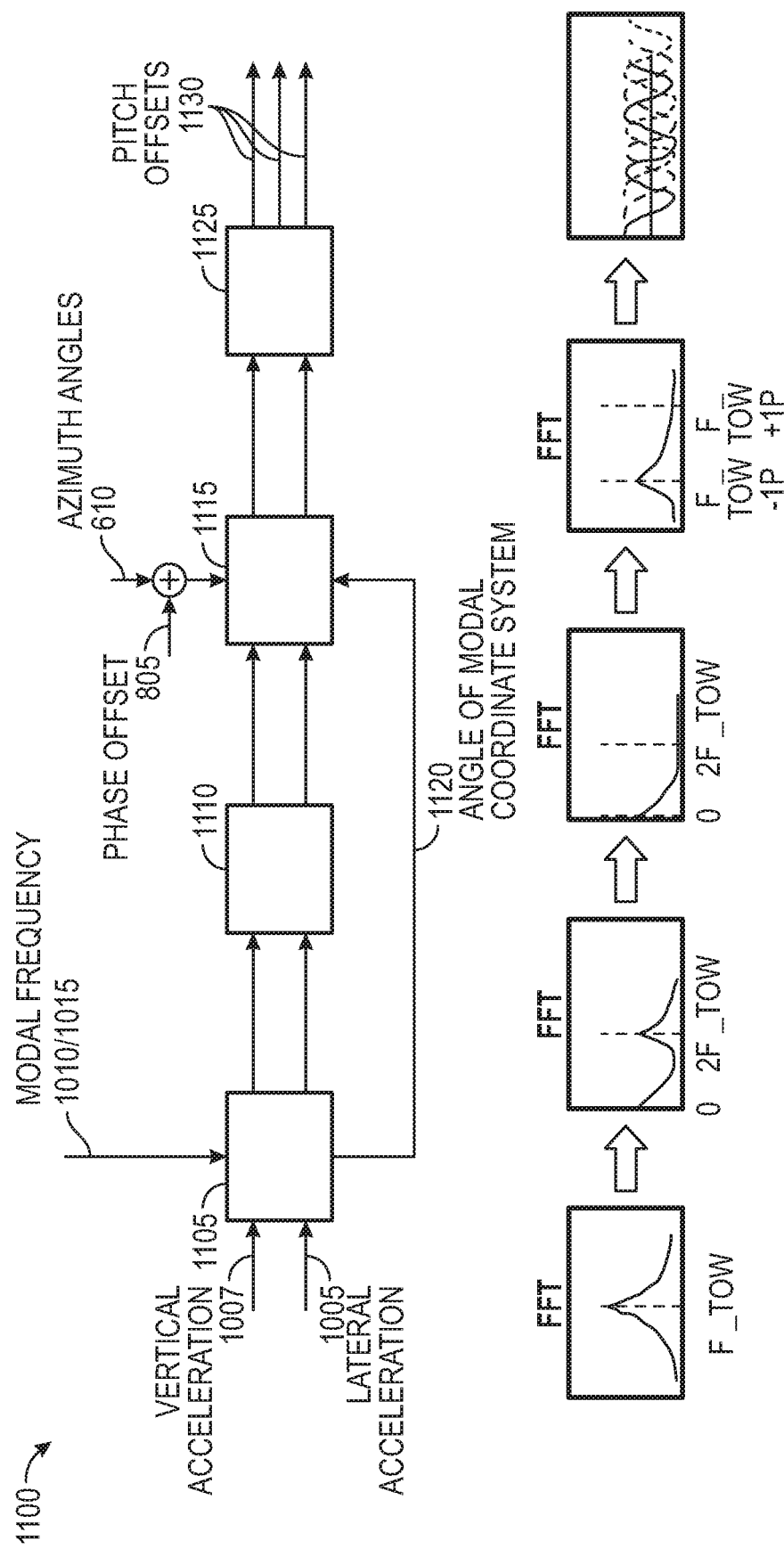
FIG. 11 illustrates a control algorithm for generating pitch offsets for dampening side-to-side motion with multiple harmonics, according to one or more embodiments described herein.

FIG. 11 illustrates a control system 1100 for generating pitch offsets for dampening side-to-side motion with multiple harmonics, according to one or more embodiments described in this present disclosure. In one embodiment, the control system 1100 can have four instances in the controller to perform the four paths illustrated by the charts 1000A and 1000B in FIG. 10. That is, two instances of the control system 1100 can be used to generate phase offsets for a first rotor while the other two instances of the control system 1100 generate phase offsets for a second rotor in the MR turbine.

Both the vertical acceleration 1007 and the lateral acceleration 1005 of the rotor are used as inputs. These accelerations 1005, 1007 and a modal frequency 1010/1015 (e.g., a first harmonic of the tower vibration or a second harmonic of the tower vibration) are input into a transform function 1105 which transforms the accelerations into the modal coordinate system (e.g., a rotating coordinate system dependent on the modal frequency 1010/1015) as discussed in block 1020 in FIG. 10. The result of this transform is shown in the underlying graph where the modal frequency 1010/1015 (i.e., F_tow) is transformed into a double peak signal with a frequency at zero and two times the modal frequency 1010/1015.

This signal is then provided to a low pass filter 1110 which removes the higher frequency components from the signals and avoids using notch filtering afterwards. The low pass filter 1110 corresponds to block 1025 in FIG. 10.

A rotation function 1115 rotates the filtered signals from the model coordinate system into the coordinate system of the rotor plane. To do so, the rotation function 1115 also receives the combination of the phase offset 805 (which is independent of the trajectory of the rotors and may be the same for all the rotors) and the azimuth angles 610. In addition, an angle 1120 of modal coordinate system is provided from the transform function 1105 and used by the rotation function 1120. Because the rotation function 1115 is performing the inverse transform of the transform function 1105, the rotation function 1115 needs the angle 1120 that was used to perform the transform into the modal coordinate system. With that information, the rotation function 1115 can transform the signals into the coordinate system of the rotor plane.

The output of the rotation function 1115 is then fed into the projection function 630 which projects the force onto the axes of the blades in the rotor. The projection function 630 then outputs individual pitch offsets 1130 that control the offset of the pitch values of the blades in the rotor relative to a fixed point in time and relative to each other. Moreover, like the control systems in FIGS. 6-8, the control system 1100 can be performed on one, some, or all of the rotors in a MR turbine. That is, while the control system 1100 can be used on multiple rotors (where two instances of the control system 1100 are used for each rotor), in another embodiment, the control system 1100 may be used to perform in-plane vibration damping for multiple harmonics only on a single rotor in a MR turbine.

In the embodiments above, a gain can be used to control the amplitude of the pitch offsets with respect to the amplitude of the motion signal. The gain could be applied to the signal(s) before or after any of the following: the rotation functions 620, 1115, harmonic filter 625, projection function 630, 1125, transform function 1105, or low pass filter 1110.

Herein, reference is made to embodiments of the invention. However, it should be understood that the invention is not limited to specific described embodiments. Instead, any combination of the features and elements discussed above, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

The block diagrams in the Figures illustrate the architecture, functionality, and operation of possible implementations of systems, methods and computer program products according to various embodiments of the present invention. In this regard, block diagrams may represent a module, segment, or portion of code, which comprises one or more executable instructions for implementing the specified logical function(s). It will also be noted that each block of the block diagrams, and combinations of blocks in the block diagrams, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A multi-rotor (MR) wind turbine, comprising:
   a tower structure;
   at least two rotors assemblies supported by the tower structure, each of the rotor assemblies comprising a plurality of blades;
   one or more sensors configured to detect a lateral acceleration and a vertical acceleration in a rotor plane of a first rotor assembly of the at least two rotors assemblies; and
   a controller configured to:
      filter a signal corresponding to the vertical acceleration of the first rotor assembly to remove an effect of gravity from the vertical acceleration of the first rotor assembly; and
      determine, based at least in part on the lateral acceleration of the first rotor assembly and the vertical acceleration of the first rotor assembly, pitch offsets for controlling pitch angles of the plurality of blades of the first rotor assembly to produce an in-plane force in the form of a rotating or an oscillating force in the rotor plane of the first rotor assembly such that a phase of the in-plane force causes the in-plane force to dampen both the lateral acceleration and the vertical acceleration.

2. The MR wind turbine of claim 1, wherein the one or more sensors are disposed proximate to the first rotor assembly, the MR wind turbine further comprising:
   a second sensor disposed proximate to a second rotor assembly of the at least two rotors assemblies and is configured to generate a second signal corresponding to in-plane motion in a rotor plane of the second rotor assembly,
   wherein the controller is configured to:
      receive the second signal; and
      determine second pitch offsets for controlling pitch angles of the plurality of blades of the second rotor assembly to produce an in-plane force in the form of a rotating or an oscillating force in the rotor plane of the second rotor assembly such that a phase of the in-plane force is dependent on a trajectory of the second rotor assembly caused by the in-plane motion, wherein the trajectory of the second rotor assembly is different from a trajectory of the first rotor assembly and comprises both a lateral displacement and a vertical displacement.

3. The MR wind turbine of claim 2, wherein the pitch angles for the first rotor assembly result in the in-plane force in the rotor plane of the first rotor assembly having a phase offset relative to the in-plane force in the rotor plane in the second rotor assembly caused by the pitch angles for the second rotor assembly.

4. The MR wind turbine of claim 2, wherein the controller is configured to receive a first phase offset corresponding to first rotor assembly and a second phase offset corresponding to the second rotor assembly to determine the pitch offsets for the first and second rotor assemblies, and wherein the first and second phase offsets are different, constant values.

5. The MR wind turbine of claim 2, wherein the controller is configured to receive a first phase offset corresponding to the first rotor assembly and a second phase offset corresponding to the second rotor assembly to determine the pitch offsets for the first and second rotor assemblies, and wherein the first and second phase offsets are the same, constant value.

6. The MR wind turbine of claim 1, wherein the controller is configured to:
   receive a first tower frequency of a first harmonic of the tower structure and a second tower frequency of a second harmonic of the tower structure,
   wherein the pitch offsets of the first rotor assembly are derived to counter a side-to-side motion caused by the first and second tower frequencies, wherein the side-to-side motion is substantially perpendicular to an upwind direction.

7. The MR wind turbine of claim 1, wherein the controller is configured to receive azimuth angles of the plurality of blades connected to the first rotor assembly and determine the phase offsets further based on the azimuth angles.

8. The MR wind turbine of claim 1, wherein the controller is configured to generate pitch values for the plurality of blades of a second rotor assembly of the at least two rotors assemblies without considering a side-to-side motion of the tower structure that is substantially perpendicular to an upwind direction, wherein the in-plane force dampens the side-to-side motion.

9. The MR wind turbine of claim 1, wherein the first rotor assembly is disposed on a first arm extending from the tower structure in a first direction and a second rotor assembly of the at least two rotors assemblies is disposed on a second arm extending from the tower structure in a second direction opposite the first direction.

10. The MR wind turbine of claim 1, wherein the tower structure comprises two support elements formed at two different non-perpendicular angles relative to a ground surface, wherein the first rotor assembly is disposed on a first one of the two support elements and a second rotor assembly of the at least two rotors assemblies is disposed on a second one of the two support elements.

11. A method for operating a wind turbine comprising at least two rotors assemblies supported by a tower structure, each of the rotor assemblies comprising a plurality of blades, the method comprising:
   detecting a lateral acceleration and a vertical acceleration in a rotor plane of a first rotor assembly of the at least two rotors assemblies;
   filtering a signal corresponding to the vertical acceleration of the first rotor assembly to remove an effect of gravity from the vertical acceleration of the first rotor assembly; and
   determining, based at least in part on the lateral acceleration of the first rotor assembly and the vertical acceleration of the first rotor assembly, pitch offsets for controlling pitch angles of the plurality of blades of the first rotor assembly to produce an in-plane force in the form of a rotating or an oscillating force in the rotor plane of the first rotor assembly such that a phase of the in-plane force causes the in-plane force to dampen both the lateral acceleration and the vertical acceleration.

12. The method of claim 11, further comprising:
   receiving a second signal corresponding to in-plane motion in a rotor plane of a second rotor assembly; and
   determining second pitch offsets for controlling pitch angles of the plurality of blades of the second rotor assembly to produce an in-plane force in the form of a rotating or an oscillating force in the rotor plane of the second rotor assembly such that a phase of the in-plane force is dependent on a trajectory of the second rotor assembly caused by the in-plane motion, wherein the trajectory of the second rotor assembly is different from a trajectory of the first rotor assembly and comprises both a lateral displacement and a vertical displacement.

13. The method of claim 12, wherein the pitch angles for the first rotor assembly result in the in-plane force in the rotor plane of the first rotor assembly having a phase offset relative to the in-plane force in the rotor plane in the second rotor assembly caused by the second pitch angles for the second rotor assembly.

14. The method of claim 12, further comprising receiving a first phase offset corresponding to first rotor assembly and a second phase offset corresponding to the second rotor assembly to determine the pitch offsets for the first and second rotor assemblies, and wherein the first and second phase offsets are different, constant values.

15. A non-transitory computer-readable storage medium having computer-readable program code embodied therewith, the computer-readable program code configured to perform an operation for operating a wind turbine comprising at least two rotors assemblies supported by a tower structure, each of the rotor assemblies comprising a plurality of blades, the operation comprising:
   detecting a lateral acceleration and a vertical acceleration in a rotor plane of a first rotor assembly of the at least two rotors assemblies;
   filtering a signal corresponding to the vertical acceleration of the first rotor assembly to remove an effect of gravity from the vertical acceleration of the first rotor assembly; and
   determining, based at least in part on the lateral acceleration of the first rotor assembly and the vertical acceleration of the first rotor assembly, pitch offsets for controlling pitch angles of the plurality of blades of the first rotor assembly to produce an in-plane force in the form of a rotating or an oscillating force in the rotor plane of the first rotor assembly such that a phase of the in-plane force causes the in-plane force to dampen both the lateral acceleration and the vertical acceleration.

16. The non-transitory computer-readable storage medium of claim 15, wherein the operation further comprises:
   receiving a second signal corresponding to in-plane motion in a rotor plane of a second rotor assembly; and
   determining second pitch offsets for controlling pitch angles of the plurality of blades of the second rotor assembly to produce an in-plane force in the form of a rotating or an oscillating force in the rotor plane of the second rotor assembly such that a phase of the in-plane force is dependent on a trajectory of the second rotor assembly caused by the in-plane motion, wherein the trajectory of the second rotor assembly is different from a trajectory of the first rotor assembly and comprises both a lateral displacement and a vertical displacement.

17. The non-transitory computer-readable storage medium of claim 16, wherein the pitch angles for the first rotor assembly result in the in-plane force in the rotor plane of the first rotor assembly having a phase offset relative to the in-plane force in the rotor plane in the second rotor assembly caused by the second pitch angles for the second rotor assembly.

18. The non-transitory computer-readable storage medium of claim 16, wherein the operation further comprises receiving a first phase offset corresponding to first rotor assembly and a second phase offset corresponding to the second rotor assembly to determine the pitch offsets for the first and second rotor assemblies, and wherein the first and second phase offsets are different, constant values.

* * * * *